United States Patent [19]

Rougeot et al.

[11] 4,147,933
[45] Apr. 3, 1979

[54] SOLID-STATE DEVICE FOR DETECTING AND LOCATING THE POINTS OF IMPACT OF IONIZING RADIATION

[75] Inventors: Henri Rougeot; Guy Roziere, both of Paris, France

[73] Assignee: Thomson-CSF, Paris, France

[21] Appl. No.: 795,425

[22] Filed: May 10, 1977

[30] Foreign Application Priority Data

May 14, 1976 [FR] France .................. 76 14716

[51] Int. Cl.² .............................................. G01T 1/22
[52] U.S. Cl. .................................................. 250/370
[58] Field of Search ................... 250/370, 371; 357/29

[56] References Cited

U.S. PATENT DOCUMENTS

| 3,691,382 | 9/1972 | Somer | 250/370 X |
|---|---|---|---|
| 3,890,506 | 6/1975 | Berninger | 250/370 |
| 3,989,946 | 11/1976 | Chapman et al. | 250/370 X |

Primary Examiner—Davis L. Willis
Attorney, Agent, or Firm—Roland Plottel

[57] ABSTRACT

A semiconductor body contains microscopic passages in which multiplication of the free electrons appearing at the entrances to said passages, under the effect of the incident (arrow) ionizing radiation, takes place. In the drawing, the reference 2 signifies the conductive film forming a surface barrier in conjunction with the semiconductor body which is endowed with the property of secondary emission with an emission coefficient better than unity; $V_o$ signifies the voltage applied to the terminals of said barrier; 5 and 6 designate the electron collector.

7 Claims, 3 Drawing Figures

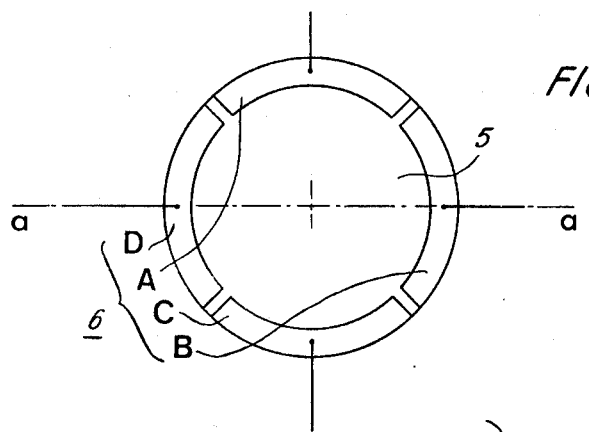
FIG·2
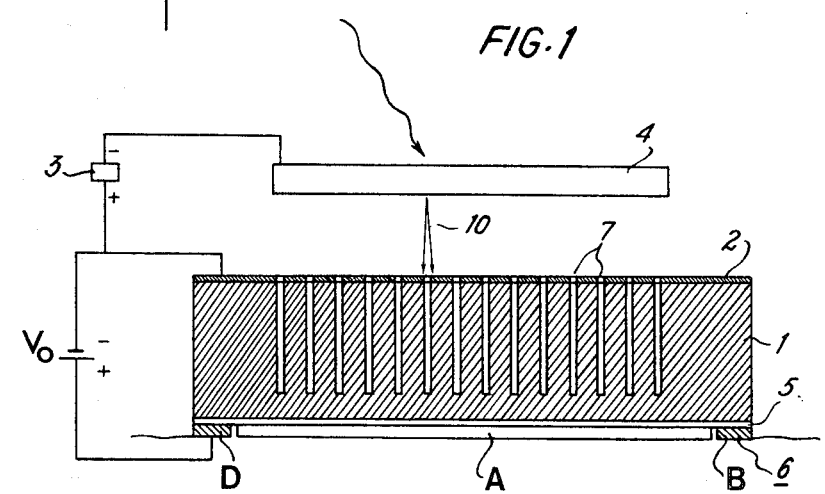
FIG·1
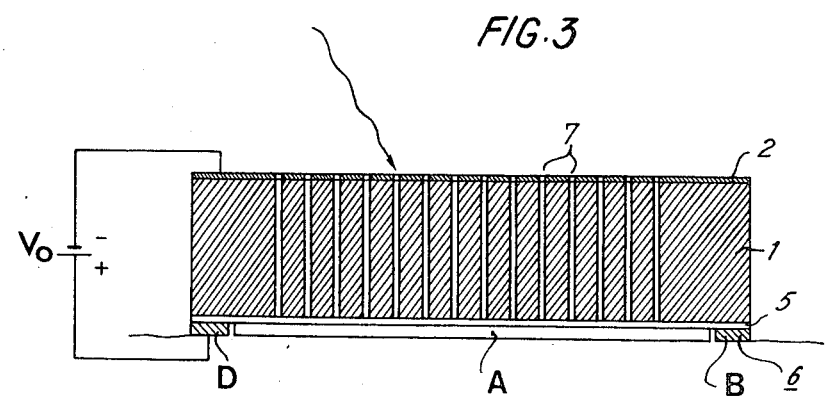
FIG·3

SOLID-STATE DEVICE FOR DETECTING AND LOCATING THE POINTS OF IMPACT OF IONIZING RADIATION

The present invention relates to a semiconductor device for detecting and locating ionising radiation impacts.

In nuclear physics, in medicine and numerous other fields, there is often the need not merely to detect the presence of ionising radiation such as x-rays α,β or γ radiation but also to locate the points of impact of this radiation.

The primary features of the devices which can be used to perform this kind of detection and locating, are their spatial resolution, that is to say the smallest distance between two separate impacts, which they are capable of detecting, and their energetic resolution, that is to say the smallest difference in energy level which they are capable of detecting.

First of all, we will recapitulate upon the design and operation of a prior art kind of device for performing this detecting and locating function.

In certain prior art devices, the locating body is constituted by a thin resistive film applied to an insulating substrate in contact with four pick-up sectors. It is associated with an electronemissive detector arranged in front of the locating body in the trajectory of the radiation. The electron-emitter produces an electron beam from the point of impact of the ionising radiation. This beam is accelerated by an electric field established between the emitter and the resistive layer or film of the locating body. The electrons captured by the resistive film are picked up by four thick, peripheral, electrically conductive elements, A, B, C, D, in contact with the resistive film which performs the function of a resistive divider. Measurement of the charge quantity picked up by each of these sectors makes it possible, using a computer, to very simply determine the barycentre of the point of impact of the electron beam on the resistive film, and of the ionising radiation.

To determine the barycentre the ratios:

$$(QA - QB/QA + QB) \text{ and } (QC - QD/QC + QD)$$

are formed
where QA, QB, QC, QD designate the charges picked up by each of the four sectors.

As far as the incident radiation is concerned, this being proportional to the quantity of the electrons emitted by the detector, this is measured by the sum QA + QB + QC + QD.

In other devices, also belonging to the prior art, the resistive film is deposited directly upon the radiation detector. The device then comprises a substrate in the form of a wafer made of a high-purity semiconductor material, and having on that face which is to be exposed to the incident ionising radiations, a rectifier diode structure in the form of a metal-semiconductor contact (Schottky diode) or in the form of a pn junction. The purity of the semiconductor material, and its thickness, are chosen so that the space charge zone in these diodes extends through the full thickness of the semiconductor substrate (the other face of the latter carries the resistive film of the locating device) when a potential difference is maintained between said film and the junction on the other face. This resistive film operates as indicated before, in association with four pick-up sectors A, B, C, D. These latter devices operate as follows.

Under the effect of ionising radiation, electron-hole pairs are created in the space charged zone of the semiconductors. The electric field existing in this zone attracts the electrons to the resistive film along a trajectory directed in accordance with the electric field and perpendicular to the faces of the semiconductor wafer. These electrons are picked up by the sectors A, B, C, D, whose signals are used, under the conditions already outlined, to determine the centre of gravity of the point of impact of the incident radiation upon the radiation detector. In this context, reference should be made to U.S. Pat. No. 3,890,506.

In relation to the first devices described, this arrangement has the advantages of making it possible to improve the accuracy of locating by producing stronger pulses at the four pick-up sectors. The total quantity of the electrons received by the assembly of pick-up sectors is proportional to the energy of the incident particle. Using a silicon substrate, this improvement is already appreciable in relation to the other prior art devices described earlier on. An incident energy of 3.5 eV produces an electron-hole pair in the silicon.

However, this improvement is still insufficient to enable good spatial resolution together with detection of incident radiation below a certain energy level, to be achieved.

The object of the present invention is a solid-state detector and locating device for ionising radiation, which enables finer resolution than is possible with the known prior art devices to be achieved, as well as detection of lower energy radiations.

Like the last ones of the devices described previously, the device in accordance with the invention comprises a resistive film and a semiconductor detector. In accordance with a novel arrangement, however, it furthermore provides a network of microscopic electron-multiplier passages formed in the semiconductor in accordance with the conditions and results now to be explained.

The invention will be better understood from a consideration of the ensuing description and the attached figures where:

FIG. 1 is a schematic sectional view illustrating the structure of the device in accordance with the invention;

FIG. 2 is a plan view of the device shown in FIG. 1;

FIG. 3 is a variant embodiment of the structure shown in FIG. 1.

The structure illustrated by way of non-limitative example in FIG. 1 exhibits, on one of the faces of a wafer 1 of a semiconductor body, a surface barrier or Schottky barrier formed by coating this face with an electrically conductive film 2.

This face of the wafer is located opposite a body 4, or detector, emitting electrons when subjected to the incident ionising radiation which is to be detected and which has been illustrated by the wavy arrow.

The electron beam, marked by the arrows 10 and emitted by the detector 4 at the location of impact of the ionising radiation, is accelerated towards the wafer by a direct voltage source shown at 3; to the opposite face of the wafer 1, the fine resistive film, marked 5, and the four conductive sectors A, B, C, D, of the bodies described earlier, are applied. The assembly of these latter sectors, FIG. 2 showing their arrangement, is designated by the reference 6; this figure illustrates the wafer in a bottom plan view. FIG. 1, already described, as well as FIG. 3 which will be described later on, are sections on a different scale, taken through the axis aa of FIG. 2. Each of the foregoing sectors carries an unmarked lead.

In the devices in accordance with the invention, the wafer 1 contains a network of microscopic passages marked 7. The microscopic passages open out at that face of the wafer 1 which is opposite the body 4 and, in the example, are blind, that is closed, at their opposite ends.

Between the film 2 and the conductive sectors 6, the direct source maintains the potential difference Vo in operation; the semiconductor body forming the wafer 1 on the other hand has an impurity ratio such that the space charge zone created in the semiconductor beneath the surface barrier due to the effect of the potential difference extends through the full thickness of the wafer. In this space charge zone an electric field directed perpendicularly to the faces of the wafer exists. For a given value of the Vo, this zone is the deeper the higher the impurity ratio in the semiconductor body. In the case of an n-type silicon crystal having an impurity ratio corresponding to a resistivity of $10^4$ ohm.cm, this thickness is 1mm for a voltage $V_o$ of 400 volts. The semiconductor material chosen to form the wafer 1 of the bodies in accordance with the invention, also has the property of secondary electron emission whith an emission coefficient better than unity. The silicon referred to earlier possesses this property.

The operation of the body described is thus as follows.

When an electron coming from the electron-emissive detector 4 strikes the wall of a microscopic passage, electron multiplication takes place there due to the existence of a longitudinal electric field and to the aforementioned property of secondary emission, the gain in number of electrons reaching values ranging from $10^3$ to $10^9$ depending upon the characteristics of the passage, in particular the length and emission coefficient of the walls. The electrons produced by this multiplication effect pass through the space charged zone of the semiconductor between the bottom of the microscopic passage and the bottom face of the semiconductor, and are picked up by the resistive film 5 and thence by the sectors A, B, C, D. Very weak energies are sufficient to produce this multiplication effect.

By way of example it is worth noting that an incident energy of 35 electron-volts will only produce 10 electron-hole pairs in a prior art device of the kind described earlier; the same energy will suffice, under certain conditions, to saturate the multiplication action taking place in the microscopic passages of the devices in accordance with the present invention, and to produce the aforesaid maximum gain of $10^9$.

However, the accuracy of the locating of the point of impact of the electron beam upon the wafer 1 and therefore of the incident ionising radiation striking the detector 4 depends, other things being equal, upon the number of electrons picked up by the system 5, 6 shown in FIG. 1. The fluctuation $\epsilon$ in the locating of the barycentre of the point of impact, this function being performed by the signals being picked off from the four sectors A, B, C, D, is given by a formula which takes account not only of the absolute temperature of the semiconductor, the resistance of the film 5 and the time constant of the electronic system processing the signals furnished by these sectors, but also of the charge quantity Q picked up. This fluctuation is the less marked the larger Q is; it is inversely proporational to the latter quantity. This illustrates the significance of the electron-multiplying effect taking place in the bodies in accordance with the invention. At ambient temperature and with the time constants normally encountered in electronic processing systems, the fluctuating in question will, in the prior art devices, be of the order of 250 microns for silicon semiconductor with a resistive film having a resistance of megohm, and for a number of electrons $3 \times 10^6$, this corresponding to an incident energy of the order of 1 Mev.

The same accuracy is achieved with the devices in accordance with the invention, for incident energies which are very substantially less than those just quoted, of the order 100th or 1,000th of these latter in the case of the values referred to earlier. For the same incident energies, an accuracy 100 to 1000 times better would readily be achieved using the devices in accordance with the invention.

The device in accordance with the invention has been described in the foregoing example, in the context of a conductive film 2 applied to one of the faces of the semiconductor wafer 1 in order to form at that face a Schottky barrier. A pn junction formed on this face by the diffusion of p-type impurities into a semiconductor substrate of n-type material, would achieve the same result. To this end, the variant embodiment which incorporates this kind of junction is also included in the invention.

In addition, the device has been described in the context of the case in which the charges are introduced into the semiconductor by an electron beam emitted by a body marked 4, under the effect of the incident ionising radiation. Bodies of this kind are known from the prior art and it is for this reason that no detailed description of them has been given here since they do not depend upon the invention. Similarly, for the same reasons a detailed description of the generation of the electrons emitted by this body under the effect of the incident radiation, has been deliberately omitted. The description has been limited to the illustration of the source 3 accelerating these electrons from the body 4 towards the wafer 1.

In accordance with what has been said in relation to the prior art, these electrons can also be directly created in the semiconductor wafer 1 by the impact of the incident ionising radiation there. In this case, the device in accordance with the invention does not incorporate the body 4; this variant embodiment, in which the electron-hole pairs are created at the entrance to the microscopic passages, forms of the object of FIG. 3, where the passages 7 are open at both ends.

The implementation of the device in accordance with the invention may vary in accordance with circumstances.

Let us assume that by some method or other the energy of the particle or the incident radiation has been determined and that all that is required is to accurately locate the point of impact. In this case, the characteristics will be chosen so that the electron-multiplying phenomenon occuring in the microscopic passages reaches the saturation level. In this method of operation, whatever the number of energy of the particles at the entrance to the passage, the number of electrons picked off by the resistive film 5 will be constant and equal to the aforesaid maximum, that is to say $10^9$ electrons per passage approximately. This will then yield excellent accuracy in locating the impact, because of the high amplitudes of the pulses picked off by the pick-up elements A, B, C, D.

In the case, on the other hand, where the result to be achieved using the device in accordance with the invention, is a measurement of the intensity of the incident radiation, operations will be conducted in such a fashion that the condition of electron saturation within the microscopic passages, is not achieved; under these circumstances, the quantity of electrons QA + QB + QC + QD picked off by the four sectors A B C D arranged on the resistive film 5, during the course of a pulse, will be proportional to the number of electrons at the entrance of the microscopic passage 7 upon which the electron beam coming from the body 4 is incident, or to the number of electrons generated by the impact of the incident radiation at the entrance to this microscopic passage. In this situation, locating takes place less accurately than in the former case because of the limitation imposed on the quantity of electrons captured. This accuracy, however, may nevertheless be substantially higher than that of the locating permitted by the prior art devices, whilst still permitting lower incident energies to be detected.

Of course, the invention is not limited to the embodiments described and shown, which were given solely by way of example.

What is claimed is:

1. A device for detecting and locating ionising radiation, comprising a semiconductor body; means for creating throughout the thickness of said body, between two opposite faces thereof, a space charge zone in which an electric field substantially perpendicular to said faces exits, within which field the displacement of free electrons appearing on one of said two faces in the semiconductor body under the effect of the incident ionising radiation, occurs; means at the other of the two faces for picking up said free electrons, as well as for locating the point of impact of said electrons on said pick-up means; characterised in that said semiconductor body has the property of secondary emission, with an emission coefficient better than unity; and in that it contains a network of microscopic passages extending perpendicularly to said two faces, said passages opening out at that face of the semiconductor at which said free electrons appear.

2. A device for detecting and locating ionising radiation, as claimed in claim 1, characterised in that said free electrons are created by the direct impact of said ionising radiation upon said face of the semiconductor.

3. A device for detecting and locating ionising radiation as claimed in claim 1, characterised in that said free electrons are created by the impact upon said face of an electron beam emitted by a body subjected to the impact of said ionising radiation, and are accelerated towards said semiconductor body by a potential difference applied between said body and the semiconductor body.

4. A device for detecting and locating ionising radiation as claimed in claim 1, characterised in that said means for creating said space charge zone consist of a surface barrier created at that face of the semiconductor at which said free electrons appear by a conductive coating applied to said face and said device furthermore comprising a voltage source producing a direct potential difference between said two faces.

5. A device for detecting and locating ionising radiation as claimed in claim 1, characterised in that said means for creating said space charge zone consist of pn junctions located at that face of the semiconductor at which said free electrons appear, and of means for biasing said junctions.

6. A device for detecting and locating ionising radiation as claimed in claim 1, characterised in that said microscopic passages are closed at their end opposite the end which opens out at that face of the semiconductor at which said free electrons appear.

7. A device for detecting and locating ionising radiation as claimed in claim 1, characterised in that said microscopic passages open out at their face opposite the end which opens out at that face of the semiconductor at which said free electrons appear.

* * * * *